United States Patent [19]
Moseley

[11] Patent Number: 6,065,764
[45] Date of Patent: May 23, 2000

[54] SANITARY COVER FOR A SHOPPING CART HANDLE

[76] Inventor: Christine M. Moseley, 823 Shell Beach Dr., Lake Charles, La. 70601

[21] Appl. No.: 09/141,540

[22] Filed: Aug. 28, 1998

Related U.S. Application Data

[60] Provisional application No. 60/060,181, Sep. 26, 1997.

[51] Int. Cl.[7] ........................................... B62B 5/00
[52] U.S. Cl. ........................... 280/33.992; 280/33.993; 280/DIG. 4; 150/154
[58] Field of Search .................. 280/33.992, 33.993, 280/DIG. 4; 150/154; 248/251, 252; 4/608, 609; 446/73, 74; D12/133; D34/27

[56] References Cited

U.S. PATENT DOCUMENTS

| | | | |
|---|---|---|---|
| D. 328,812 | 8/1992 | Pritchett | D34/27 |
| D. 370,110 | 5/1996 | Beam | D34/27 |
| 2,803,849 | 8/1957 | Peters | 280/33.992 |
| 2,918,741 | 12/1959 | Welter et al. | 280/33.992 |
| 3,866,649 | 2/1975 | Bringmann | 280/33.992 |
| 4,881,746 | 11/1989 | Andreesen | 280/33.992 |
| 5,215,319 | 6/1993 | Farris | 280/33.992 |
| 5,427,392 | 6/1995 | Duer | 280/33.992 |
| 5,429,377 | 7/1995 | Duer | 280/33.992 |
| 5,722,672 | 3/1998 | Frederick | 280/33.992 |
| 5,820,142 | 10/1998 | Duer | 280/33.992 |

FOREIGN PATENT DOCUMENTS

| | | | |
|---|---|---|---|
| 2 221 971 | 2/1990 | United Kingdom | 280/33.992 |
| 2 271 094 | 4/1994 | United Kingdom | 280/33.992 |

*Primary Examiner*—Eric Culbreth
*Assistant Examiner*—L. Lum
*Attorney, Agent, or Firm*—Richard C. Litman

[57] ABSTRACT

A reusable sanitary cover for a conventional shopping cart handle, to protect shoppers and their infants or small children from the germ-laden surface thereof. In the preferred embodiment, the cover comprises a flexible sheet of washable material that is shaped into a cylinder that securely fits a shopping cart handle. A slit allows a customer to press the cover onto the handle. The material used for the sheet promotes a child's safe, sanitary teething or oral contact with the cover. Also, the cover incorporates amusing distractive features to occupy infants and children while the parent or adult shops. An alternative embodiment of the cover comprises two rectangular transparent sheets of material having snap members that secure the cover onto the handle during use and defining a hermetic, watertight enclosure that contains a volume of transparent fluid, preferably purified water. Glitter particles and novelty-shaped pieces of brightly-colored foil or sheet plastic are suspended in the fluid, and are visible through it and the transparent material of sheets, providing another amusing distraction for the infant or small child seated in the shopping cart.

4 Claims, 5 Drawing Sheets

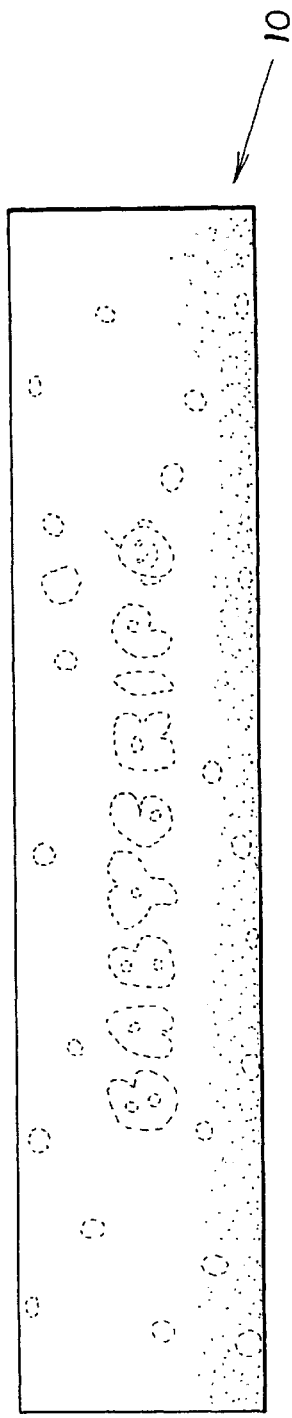
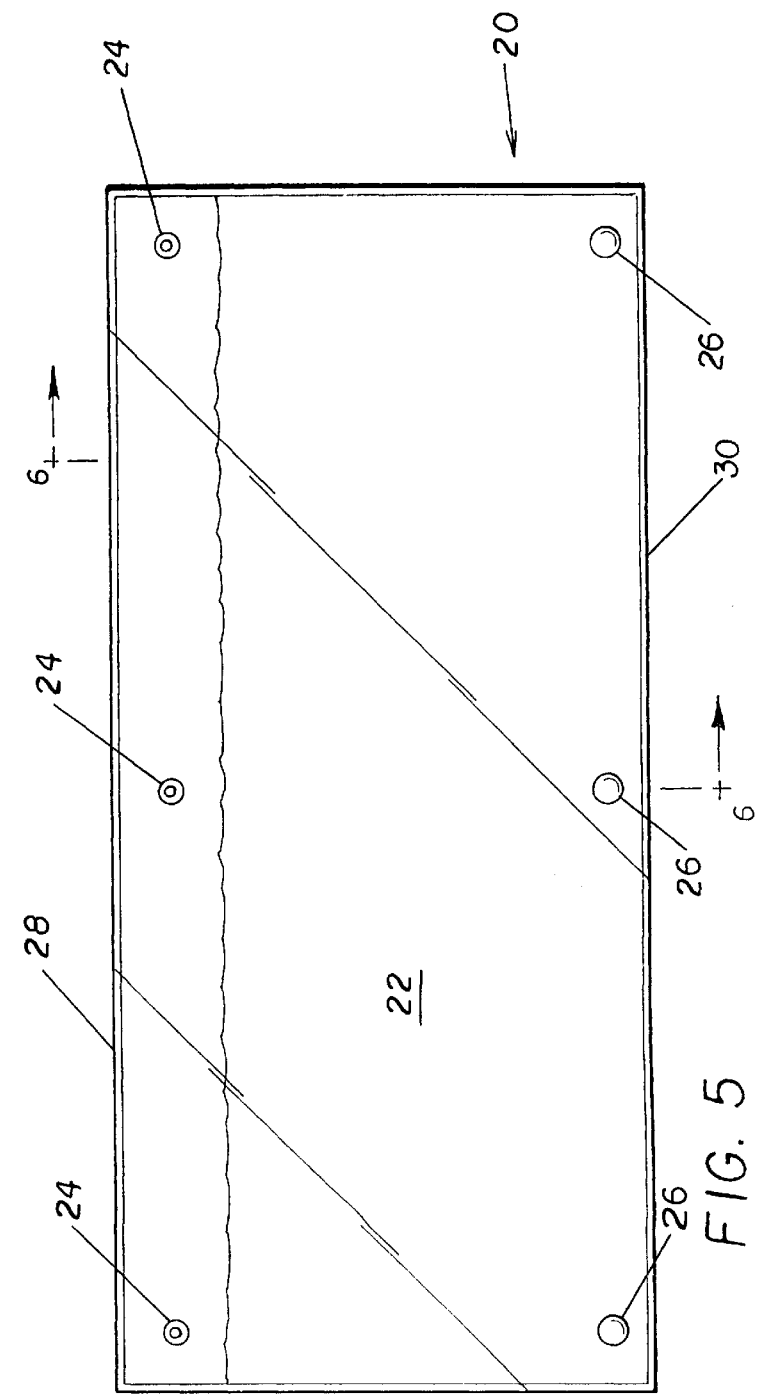

SANITARY COVER FOR A SHOPPING CART HANDLE

CROSS-REFERENCE TO RELATED APPLICATION

This application claims the benefit of U.S. Provisional patent Application Ser. No. 60/060,181, filed Sep. 26, 1997.

BACKGROUND OF THE INVENTION

1. Field of the Invention

The present invention relates to sanitary shopping cart handle covers, and more specifically to reusable prophylactic shopping cart handle covers that are manufactured from a hypoallergenic, non-toxic material allowing an infant or small child to safely teeth thereon while seated in a shopping cart, and that have features attractive to an infant or a child.

2. Description of the Relevant Art

The widespread use of shopping carts in supermarkets, some department stores and other retail merchandise establishments has greatly simplified shopping for the consumer. The cart allows consumers to pick up a plurality of desired items for purchase and place them in the cart, while keeping their hands free and affording them mobility to move through the store while shopping.

A problem with store-owned shopping carts, as with any item frequently handled by numerous members of the public, involves the accumulation of germs, namely bacteria and other skin-borne infectious agents, on shopping cart handles. Each successive shopper handling the cart comes into contact with the germs of the prior shopper, and further deposits his own germs. To remedy this situation, the store itself could sanitize the handle of each shopping cart after each use thereof. This however, would be an unrealistic solution, as several customers handle each of the store's scores of shopping carts daily, and to implement such a sanitation program would be costly and time-consuming for the store. It is therefore upon the germ-conscious individual to solve this problem.

A further, related problem concerns infants and small children, who, while seated in a shopping cart, often teeth on or chew on the handle, thereby coming into immediate oral contact with this source of germs. While a shopper could wear gloves to protect himself from the handle, this would not prevent a child from teething on or otherwise orally contacting the exposed handle.

Several inventions and patents have involved devices that aim to solve one or both of these related sanitary problems. U.S. Pat. No. 2,803,849 describes a tubular paper cover that slips onto a specially-designed shopping cart handle having one end that removably engages the body of the cart. Accordingly, the sanitary handle cover of '849 is not compatible with conventional shopping carts, and would incur an immense expense for stores to replace their supply of conventional carts or to install the special handles thereon. Furthermore, the handle cover of '849 is paper, through which a teething child could easily and quickly chew, makes it unsatisfactory as a prophylactic device.

The disposable shopping cart handle cover of U.S. Pat. No. 5,215,319 comprises a single rolled sheet of semi-rigid plastic in the preferred embodiment of the invention. The rolled sheet is cut longitudinally along one side, with a notch, to facilitate placement of the cover onto a shopping cart handle. The handle cover is also individually wrapped to further maintain its sanitary state until the time of use. An alternative embodiment of the handle cover of '319, illustrated in FIG. 9, involves mounting a roll of plastic wrap, or other disposable material, with a cutting edge on the cart near the handle, so that each successive customer can pull a length of plastic wrap sufficient to cover the handle. Both of these embodiments of '319 would produce a significant increase in plastic waste, contributing to the deluge of disposable plastic products currently employed in stores. Unlike plastic bags and food containers, however, the used handles could not be recycled, given the accumulation of germs on their surface. Beyond being environmentally unsound, these embodiments of '319 also fail to adequately address the teething problem, as neither the semi-rigid plastic nor the plastic wrap have the integrity to withstand continuous teething. Moreover each of these materials would pose a significant health risk to the child if ingested, a likely possibility given the ease with which these materials can be chewed through.

U.S. Pat. No. 5,722,672 discloses a removable protective cover that can be attached to a shopping cart handle or a rented stroller. Additionally, the protective cover of '672 is washable and reusable. Like some of the previously discussed patents, the cover of '672 is environmentally unsound because of its use of plastic for fabricating the cover. Moreover, the protective cover lacks features that are likely to attract a child's attention to the protective cover rather than some other structure within the child's reach.

U.S. Pat. Nos. 3,866,649 and 4,881,746 disclose shopping cart handle covers that incorporate means for occupying an infant or small child seated in the cart. Any distraction for the infant or child greatly assists the parent or adult who is shopping, as the child's attention is drawn away from desired products that the child would otherwise incessantly beg the parent or adult to purchase. The handle cover of '649 comprises a string of ornaments, such as beads, bells or plastic figurines, having both ends secured to the handle cover. The string distracts the child from the handle cover, but is not safe for teething, as the small ornaments thereon can come loose and be swallowed. The handle cover of '746 includes a strap that secure a toy, such as a teething ring, onto it. Unfortunately, the toy can be easily disengaged from the strap, possibly dropped onto the floor of the store and lost. Moreover, the string of ornaments of the device of '649 and the toy strap of '746 each occupy and obscure a significant portion of the surface of the respective handle covers, thereby limiting the places for a customer to grip the handle cover, ultimately compromising cart maneuverability. In addition, the string of ornaments of '649 and the toy strap of '746 complicate the washing of these handle covers, and could become disengaged with repeated cleanings.

Many of the embodiments of the sanitary shopping cart handle cover of U.S. Pat. No. 5,427,392 are described as being disposable, and therefore suffer from many of the same shortcomings as the handle cover of '319, described above. Specifically, the increase in waste resulting from widespread use of the disposable handle covers disclosed in '392 would adversely affect the environment, incur an additional expense for the store and customer, and create an extra burden on the waste management personnel of stores employing such handle covers.

In addition, both the disposable and non-disposable embodiments of '392 lack any distractive features intended to make the device more attractive for use with a potentially bothersome infant or small child. One embodiment of the cover of '392 includes a coupon clip and securing thong that hangs suspended from the cover, as illustrated in FIGS. 2 and 4. Another embodiment includes end flaps that fall from both ends of a shopping cart handle to afford better protection thereof, as shown in FIG. 6. A third embodiment, shown in FIG. 7, has bifurcated end straps for adjusting the cover to fit different handle lengths. When used with smaller shopping carts, the bifurcated ends also fall from both ends of the handle. All of these embodiments incorporate terminal elements that fall from the ends of the handle, and by virtue of their location, movement and different shapes and sizes, constitute eye-catching distractions for the infant or child seated in the car, who is faced with an otherwise unremarkable cover design. In attempting to access these terminal elements, an infant or child can inadvertently contact unprotected parts of the cart, undermining the purpose of the device of '392. In squirming to reach the terminal elements, an infant or child could also displace items in the cart, or, more seriously, injure himself if left unattended.

Finally, U.S. Pat. Nos. Des. 328,812 and Des. 370,110 both illustrate types of shopping cart handle covers that circumferentially and longitudinally engage the handle.

In light of the shortcomings of the above inventions and, patents, there is a need for an environmentally sound system for covering the handles of conventional shopping carts that does not promote the increased proliferation of plastic waste. There is also a need for a prophylactic shopping cart handle cover that withstands teething and other adverse handling by an infant or child and incorporates a distracting amusement feature to occupy the infant or child without presenting unsafe conditions for the child.

None of the above inventions and patents, taken either singly or in combination, is seen to describe the instant invention as claimed.

SUMMARY OF THE INVENTION

The high turnover rate for shopping cart use by the public introduces two interrelated problems concerning the sanitary condition of shopping cart handles. Each customer handling the cart transfers bacteria and other infectious agents from his hands to the handle of the cart. This results in an unhealthy accumulation of infectious agents, or germs, on the handle surface, which ultimately leads to the proliferation of sickness and disease. Furthermore infants and small children, who, while seated in a shopping cart, often teeth on or chew on the contaminated handle, thereby incurring a great risk of contagion themselves.

The reusable sanitary cover of the present invention removably engages the handle of a conventional shopping cart, to protect shoppers and their infants or small children from the germ-laden surface thereof. The cover can be machine- or hand-washed, thereby eliminating the plastic waste generated by disposable handle covers now available. In the preferred embodiment, the cover comprises a sheet of washable, non-toxic, hypoallergenic, durable, flexible material, preferably foam rubber. The sheet is manufactured in a substantially cylindrical formation, defining a cylindrical cavity therein having a diameter dimensioned to securely and frictionally fit the shopping cart handle. A slit extends from the cavity, continuous therewith, to the outer surface of the sheet, allowing a customer to press the cover onto the handle by temporarily widening the slit and deforming the sheet to accommodate the handle.

The resiliency of the sheet material allows an infant or child to safely initiate teething or oral contact with the cover without a parent or adult worrying about germ transmission or other sanitary concerns. Also, the color, texture, indicia and artistic design of the cover comprise amusing distractive features to occupy infants and children while the parent or adult shops. A customer could purchase a plurality of covers, each bearing different features and indicia representative of various novelties, sports and characters from children's books, movies and television shows.

In an alternative embodiment of the present invention, the cover comprises two substantially rectangular transparent sheets of non-toxic, hypoallergenic, durable, flexible material, preferably polyvinyl chloride (PVC). The sheets are of sufficient dimensions to circumferentially and longitudinally engage a conventional shopping cart handle, and incorporate a plurality of male and female cooperating snap members that secure the cover onto the handle during use. Other ways to secure the cover around the handle include complementary strips of hook and loop type fastener (e.g. VELCRO brand) or a zipper.

In this embodiment as well, the material chosen for the cover allows an infant or child to safely initiate teething or oral contact with the cover without the parent or adult worrying about germ transmission or other sanitary concerns.

The sheets integrally connect along their edges to define a hermetic, watertight enclosure that contains a volume of transparent fluid, preferably purified water. Glitter particles and novelty-shaped pieces of brightly-colored foil or sheet plastic, are suspended in the fluid, and are visible through it and the transparent material of sheets. These suspensions provide another amusing distraction for the infant or small child seated in the shopping cart, also to occupy them and keep them from interfering with the shopping chores of the parent or adult. The inexhaustible number of combinations of suspensions and exterior surface features also make the cover a marketable accessory for toy manufacturers and the like, where a plurality of covers, each having suspensions, features and indicia representative of different novelties, sports and characters from children's books, movies and television shows, would be available.

Accordingly, it is a principal object of the invention to provide a prophylactic sanitary cover for conventional shopping cart handles.

It is another object of the invention to allow a customer to easily affix and remove the cover to and from a shopping cart handle.

It is a further object of the invention to provide an amusing distraction for an infant or a small child seated in a shopping cart, so as to occupy them while the parent or adult shops.

Still another object of the invention is to eliminate plastic waste.

It is an also object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a top plan view of the preferred embodiment of the invention according to FIG. 1.

FIG. 5 is a front plan view of an alternative embodiment of the invention according to FIG. 4.

Similar reference characters denote corresponding features consistently throughout the attached drawings.

DETAILED DESCRIPTION OF THE PREFERRED EMBODIMENTS

Figure 1:
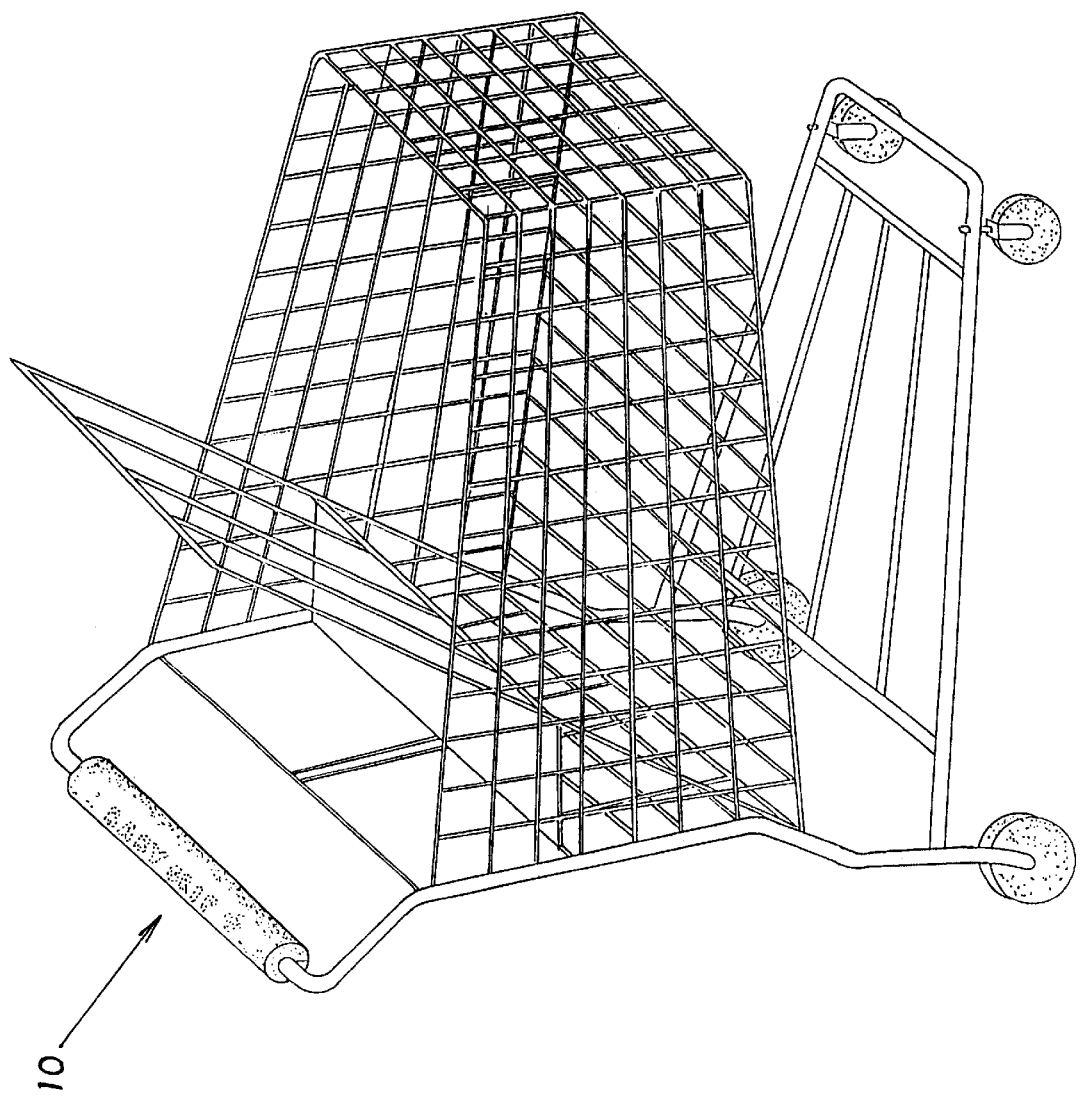
FIG. 1 is an environmental view of the preferred embodiment of the sanitary cover of the present invention, secured in place on a shopping cart.
Figure 2:
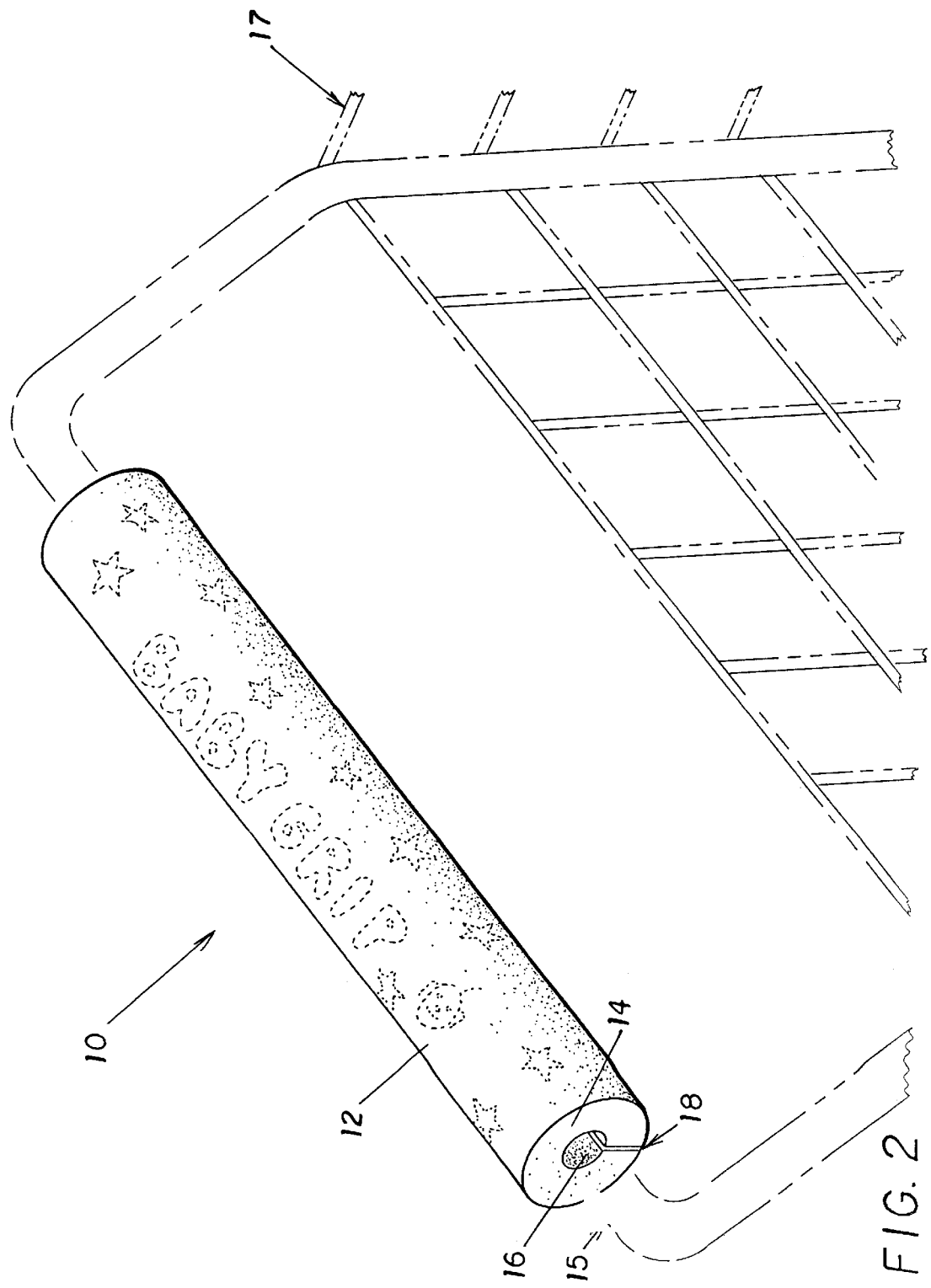
FIG. 2 is a perspective view of the preferred embodiment of the invention according to FIG. 1.

One of the preferred embodiments of the present invention is shown in FIGS. 1 and 2, where the cover of the invention is referenced as 10. Cover 10 removably engages a shopping cart handle 15 of a conventional shopping cart 17. In this embodiment cover 10 comprises a sheet 12 of non-toxic, hypoallergenic durable, flexible material, preferably foam rubber. Sheet 12 is manufactured in a substantially cylindrical formation, with end surfaces 14 having a substantially circular cross section. The cylinder formed by sheet 12 defines a cylindrical cavity 16 that extends between end surfaces 14. The diameter of cavity 16 is substantially the same as that of handle 15, ensuring its secure frictional fit thereon. A slit 18 extends from cavity 16, continuous therewith, to the outer surface of sheet 12.

In use, a customer secures cover 10 onto handle 15 by exerting pressure on slit 18 at the interface of the outer surface defining line of slit 18 and handle 15. This results in the temporary deformation of cover 10 in opening to accommodate the circumference of handle 15. Cover 10 then returns to its original shape to fit securely on handle 15, until removal thereof when the customer discards cart 17.

While foam rubber is the preferred material for cover 10, any machine- or hand-washable material having similar properties, including flexibility, durability, non-toxicity, tear resistance and padded softness, is acceptable for its manufacture. An infant or child can safely initiate teething or oral contact with cover 10 without the parent or adult worrying about germ transmission or other sanitary concerns. Furthermore, the color, texture, indicia and artistic design of cover 10 are conceived specifically for infants and small children, so that cover 10 incorporates amusing distractive features to occupy them and keep them from interfering with the shopping chores of the parent or adult. Countless possible combinations of these features make cover 10 a marketable accessory for toy manufacturers and the like, where the customer could purchase a plurality of covers, each bearing features and indicia representative of different novelties, sports and characters from children's books, movies and television shows. FIG. 3 illustrates one example of a possible cover artistic design, with busy indicia, ideally in bright colors, to maintain the attention of infants and small children.

Figure 4:
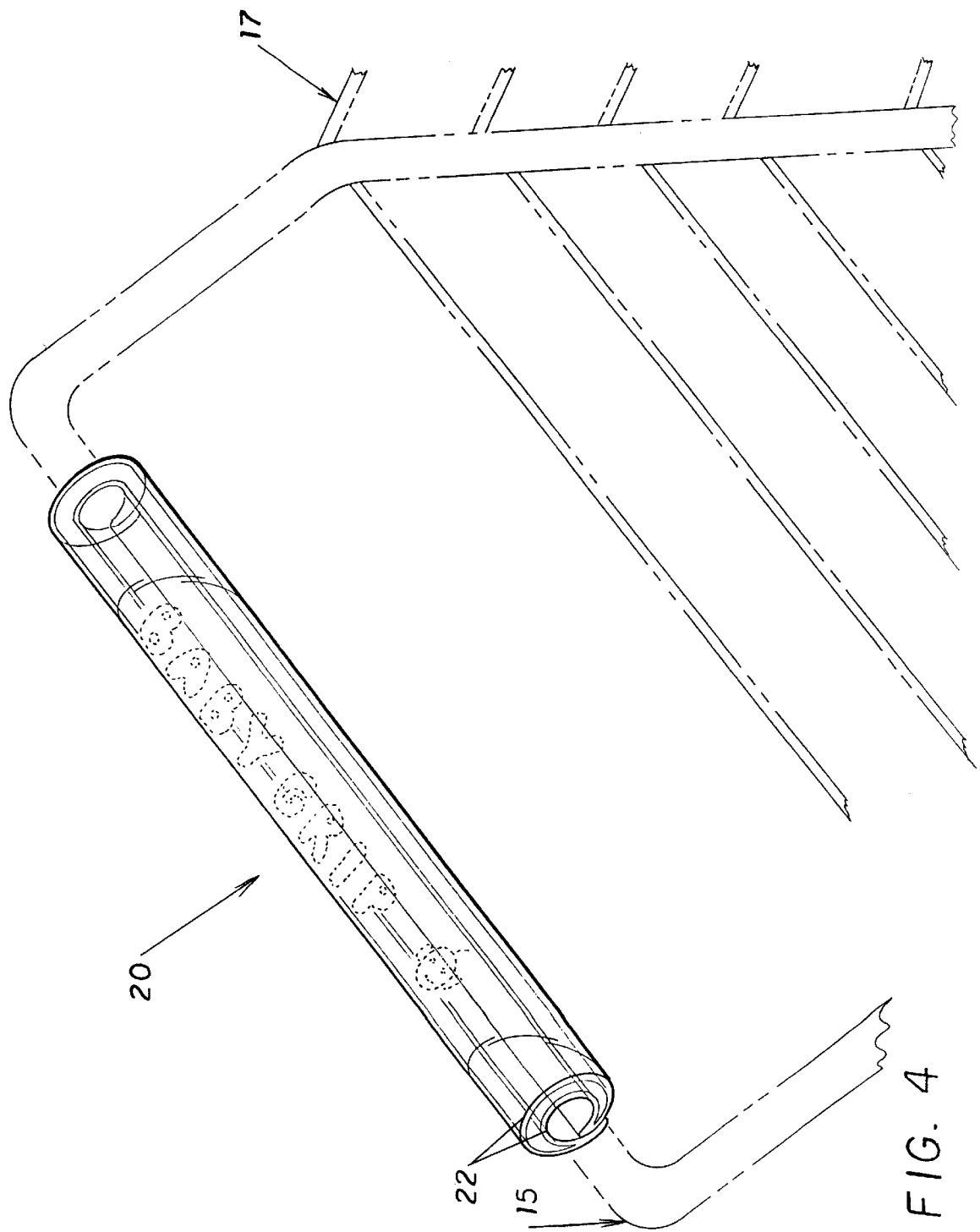
FIG. 4 is a perspective view of an alternative embodiment of the sanitary cover of the present invention, secured in place on a shopping cart in phantom lines.
Figure 6:
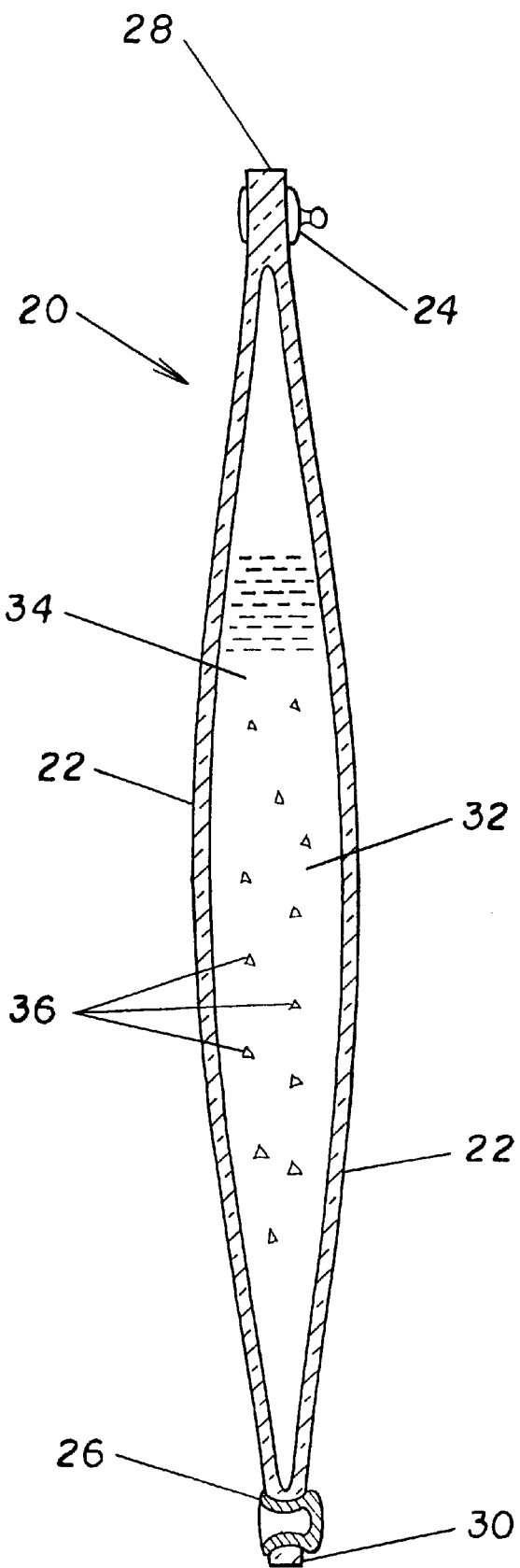
FIG. 6 is a cross-sectional view of an alternative embodiment of the invention according to FIG. 4, drawn along line 6—6 in FIG. 5.

An alternative embodiment of the present invention is illustrated in FIGS. 4, 5 and 6. The cover 20 of the alternative embodiment is shown removably engaging a shopping cart handle 15 of a conventional shopping cart 17 in FIG. 4. In this embodiment, cover 20 comprises two substantially rectangular transparent sheets 22 of non-toxic, hypoallergenic, durable, flexible material, preferably polyvinyl chloride (PVC). Sheets 22 are of sufficient dimensions to circumferentially and longitudinally engage a shopping cart handle 15 of a conventional shopping cart 17. FIGS. 5 and 6 illustrate how sheets 22 secure in place a plurality of male and female cooperating snap members 24,26 that are arranged in a linear formation along 28,30, the longer sides of cover 20, respectively. Male and female snap members 24,26 face opposite directions, so as to cooperate in the well-known fashion when cover 20 is wrapped around handle 15, to securely maintain cover 20 thereon. Other ways to secure cover 20 around handle 15 include complementary strips of hook and loop type fastener or a zipper.

In use, a customer wraps cover 20 about handle 15, and secures each of the male snap members 24 into the corresponding female snap member 26. FIG. 4 illustrates cover 20 engaging a handle 15, with an overlap of longer sides 28,30. Upon discarding cart 17 after shopping, a customer can quickly and easily disengage cover 20.

While PVC is the preferred material for cover 20, any machine- or hand-washable transparent material having similar properties, including flexibility, durability, non-toxicity, tear resistance and padded softness, is acceptable for its manufacture. An infant or child can safely initiate teething or oral contact with cover 20 without the parent or adult worrying about germ transmission or other sanitary concerns.

Referring to FIG. 6, sheets 22 integrally connect along the edges thereof to define an interior enclosure 32. Enclosure 32 is hermetic and water-tight, and contains a volume 34 of transparent fluid, preferably purified water. Glitter particles 36 and novelty-shaped pieces of brightly-colored foil or sheet plastic, are suspended in volume 34, and are visible through the transparent fluid thereof and the transparent material of sheets 22. These suspensions provide another amusing distraction for the infant or small child seated in shopping cart 17, also to occupy them and keep them from interfering with the shopping chores of the parent or adult. The inexhaustible number of combinations of suspensions and exterior surface features also make cover 20 a marketable accessory for toy manufacturers and the like, where the customer could purchase a plurality of covers, each having suspensions, features and indicia representative of different novelties, sports and characters from children's books, movies and television shows.

The specification of chosen materials for the disclose embodiments are exemplary of possible materials used in the manufacture of the invention. Materials having similar properties to those already described may be substituted, and include, but are not limited to, all types of fabrics, leather, polyethylene foam, polyurethane foam, vinyl acetate, Neoprene and DCH compounds.

It is to be understood that the present invention is not limited to the embodiments described above, but encompasses any and all embodiments within the scope of the following claims.

I claim:

1. A sanitary cover for a shopping cart handle comprising:
   two substantially rectangular transparent sheets of sufficient dimensions to circumferentially and longitudinally engage a shopping cart handle;
   wherein each of said sheets comprises:
      a first long edge,
      a second long edge,
      a first short edge, and
      a second short edge,
   wherein said sheets are integrally connected along the edges to form a hermetic, watertight enclosure;
   wherein said sheets bear amusing and distracting features and indicia for providing an amusing distraction for an infant or small child seated in the shopping cart;
   means for securing said sheets to a shopping cart handle;
   a volume of transparent fluid contained in said enclosure;

a plurality of small items suspended in said fluid; and wherein said items have qualities and properties for amusing and distracting infants and small children.

2. The sanitary cover according to claim 1, wherein said means for securing said sheets to a conventional shopping cart handle comprises a plurality of male and female cooperating snap members, said snap members being arranged in a linear formation along said first and second long sides of said sheets and facing opposite directions, so that said male snap member insertably engages said female snap member when said sheets are wrapped around a shopping cart handle, to securely maintain the cover thereon.

3. The sanitary cover according to claim 1, wherein the material of said sheets is non-toxic, hypoallergenic, durable and flexible.

4. The sanitary cover according to claim 1, wherein the material of said sheets is polyvinyl chloride.

\* \* \* \* \*